United States Patent [19] [11] 4,163,932
Leenhouts [45] Aug. 7, 1979

[54] NUMERICAL CONTROL SYSTEM AND METHOD FOR A THREE AXES MOVEMENT

[75] Inventor: Albert C. Leenhouts, Harwinton, Conn.

[73] Assignee: The Superior Electric Company, Bristol, Conn.

[21] Appl. No.: 512,665

[22] Filed: Oct. 7, 1974

[51] Int. Cl.² ............................................. G05B 19/24
[52] U.S. Cl. ..................................... 318/573; 318/574
[58] Field of Search ................. 318/573, 574, 135, 578

[56] References Cited

U.S. PATENT DOCUMENTS

| 3,461,365 | 8/1969 | Newland et al. | 318/573 |
| 3,525,917 | 8/1970 | Leenhouts | 318/138 X |
| 3,559,021 | 1/1971 | Bingham, Jr. | 318/578 X |
| 3,585,478 | 6/1971 | Leenhouts | 318/573 |
| 3,749,995 | 7/1973 | Leenhouts | 318/574 X |
| 3,864,613 | 2/1975 | Cutler | 318/573 |

Primary Examiner—J. V. Truhe
Assistant Examiner—Eugene S. Indyk
Attorney, Agent, or Firm—Ernest M. Junkins

[57] ABSTRACT

A numerical control system and method for providing actual relative movement along a path commanded by the distance along three perpendicular axes by digital movement in each axis. The actual movement is subdivided into a plurality of successive final lengths each of which may include a movement on each axis. The extent of each final length is determined by initially determining the extent of a length that is most acceptable as to deviation and velocity on the two axes having the largest and middle commanded distance and then setting the extent of the final length by determining the most acceptable extent as to deviation on the axis having the smallest distance. Each final length is made to have an extent on each axis which bears a numerical relationship with the movement on the same axis for the immediately prior length.

17 Claims, 7 Drawing Figures

NUMERICAL CONTROL SYSTEM AND METHOD FOR A THREE AXES MOVEMENT

The present invention has particular utility when used to automatically effect the movement of a machine tool from commanded information. The machine is capable of producing relative movement along three perpendicular axes by a servo drive connected to each axis. Preferably each servo drive is of the digital type in that it produces a step or incremental movement essentially simultaneously for each pulse that it receives.

In my U.S. Pat. No. 3,749,995, granted July 31, 1973 and assigned to the assignee of the present invention, there is disclosed a numerical control system of the above type in which each step of the movement is taken sequentially. Thus the system determines for each pulse the axis to which it is to be directed in order to maintain deviation of the actual path within a maximum tolerance from the commanded path.

While such a system has been found to be completely satisfactory, it requires that during a movement, the system be devoted essentially full time to the pulse axis determination which basically sets an upper limit on the velocity at which the path may be traversed. Moreover, the distribution of individual pulses to each axis may, in some instances be somewhat erratic, and could cause the axis' servo drive to have difficulty in producing a step simultaneously upon receipt of a pulse. This in turn may require additional compensating circuitry in order to assure that a step is produced for each pulse which increases the cost, complexity, possible malfunctioning of the system, and possible increased deviation from the commanded path.

It is accordingly an object of the present invention to provide a numerical control system and method for producing an actual movement along three axes that essentially corresponds to the commanded path that is defined by the distance required on each of the axes, by sub-dividing the actual movement into a plurality of successive lengths, each of which normally has an extent of more than one step on an axis.

Another object of the present invention is to achieve the above object with a numerical control system that employs a computer that is programmed according to the present method to determine the extents of each length with the length determination requiring less time than the time required to produce the movement of the length, thereby enabling the computer to be time-shared and used for other calculations.

A further object of the present invention is to provide a numerical control system that is capable of producing movement on three axes which is extremely compatible with a heretofore known system utilizing a computer and thus may be easily incorporated into such a system with a minimum alteration of the system.

Still another object of the present invention is to achieve the above objects with a method that makes a determination of the extent of each length which not only maintains the actual path within an acceptable or maximum deviation from the commanded path but also produces a speed of movement along the path which is not essentially larger than a path velocity that may be given with the commanded movement.

In my U.S. Patent application Ser. No. 474,672 filed May 10, 1974 and entitled "Method and System for Producing Linear Contouring Movement", there is disclosed a numerical control system that accepts input information of relative movement along two coordinate axes each of which has a digital servo motor. The commanded movement is subdivided into successive lengths by a method which preferably employs a computer that is programmed according to the method. Such a system may be easily adapted for use with the present invention simply by adding an additional servo drive for the third axis that is similar to the other two drives and adding the present method as another stored program in the computer with the latter being employed only when the commanded information calls for a three axes movement. Though it is preferred to utilize such a system employing a computer it will be clear to those skilled in the art that a hardwired system which may include microprocessors dedicated essentially solely to the present method may be employed if desired.

The method of the present invention defines the extent of each length by the number of steps that each axis is to produce evenly and simultaneously over the same time interval. In determining, the extents of the successive lengths, the method initially determines which axis in the commanded path which is defined by the distance along each axis has the largest, the middle and the smallest distance, utilizes these three distances irrespective of their axes during the length determination and then finally after determining the extent for the largest, middle and smallest axes, directs the extents to their respective X, Y and Z axes for subsequent movement. The extent on each axis of each length is made to be related to the extent of the immediately prior length within an absolute numerical value, such as 1, which permits a number of probable extents. However, some probable extents may be excluded by acceleration and deceleration factors, normally leaving a plurality of possible lengths. Initially, the extents of the possible lengths along the largest and middle axis in the L-M (largest and middle axis) plane are investigated to find the most acceptable length having regard to values of velocity error and path deviation in only this plane. Subsequently, the method then considers the possible extents on the smallest axis and then selects the extent for the smallest axis which produces the minimum path deviation in the L-S (largest and smallest axis) plane. In the latter determination, the velocity error produced by the additional movement on the smallest axis is and need not be considered as the velocity used in the L-M plane had been made to have only its proportional share of the commanded velocity.

Having determined the extent on the three axes, L, M and S for the most acceptable length, the system updates its registers for one of the possible lengths of the next length and then decodes the L, M and S axes extents into their corresponding X, Y and Z axes extents. Subsequently further registers are up-dated before the determination of the next length in order to maintain information necessary for acceleration, deceleration and the determination of the possible extents for the next length. As in the above-noted application, the final length is then converted into a pulse train for each axis which has the number of pulses defined by its extent of the length and the servo motors during the same time interval, will produce an actual movement on each axis corresponding to their determined extent.

Other features and advantages will hereinafter appear.

Figures 1, 2:
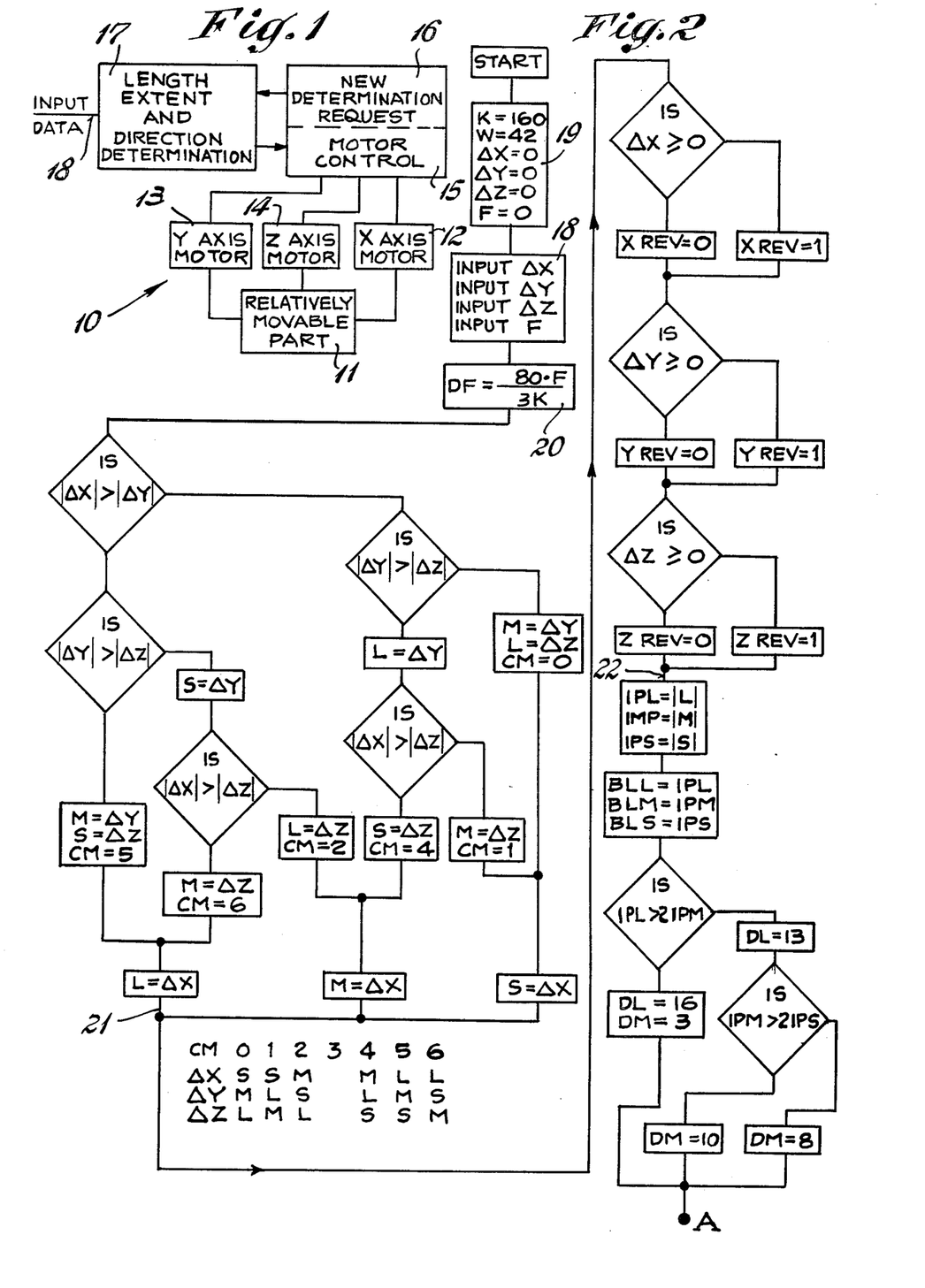
FIG. 1 is a block diagram of a numerical control system of the present invention.
FIGS. 2–2E constitute a continuous flow chart of the steps of the method of the present invention and which may be used to either program a computer or to hardwire a circuit.

Referring to the drawing, the numerical control system is generally indicated by the reference numeral 10 and is shown connected to a relatively movable part 11 which may, for example, be a tool in a machine, with the part 11 being connected to be relatively movable by operation of an X axis motor 12, a Y axis motor 13 and a Z axis motor 14. The motors are connected to the part which may be more than one part of a machine, as for example, the X and Y motors may be connected to the table of a vertical milling machine for effecting horizontal movement and the Z axis to a rotating tool to control vertical movement so that all movements with respect to material on which work is to be performed by the tool will be along three perpendicular axes.

Each of the motors is connected to its own motor control, all included within a block 15 which also has a block portion 16 denoted "new determination request". The block 15 is connected to block 17 entitled "length extent and direction determination" from which it receives an electrical representation of the extent and direction along each axis for each length. Information of the commanded movement may be obtained from any desired source, as for example, from a tape reader perhaps modified by tool compensation commands and which is supplied on an input data line 18 to the block 17. As pointed out above, the components of the system are essentially those disclosed in my above-noted application with the addition thereto of a Z axis motor and its portion of the motor control 15.

For determining the lengths, it is preferred that a general purpose computer such as Texas Instruments 980 minicomputer be employed and programmed to carry out the hereinafter disclosed method. Thus the same numerical control system may, according to the content of the input data, be set to carry out either of the two programs, namely, linear contouring for two axes or linear contouring for three axes.

Referring to FIG. 2, the input data for a three axes linear move is supplied on the line 18. The input data includes the direction and distance of the commanded path on the X, Y and Z axes, denoted $\Delta X$, $\Delta Y$ and $\Delta Z$, respectively, and also a feed rate command or desired maximum velocity of movement along the path and denoted by the representation F. Prior to the line 18, the system had been initialized for the movement by the registers which store the input information being set to zero by a block 19, it being understood that, for example, $\Delta X$ represents a register in the computer for storing a number and direction.

Further, a value of K may be supplied which is used as disclosed in my above-noted linear contouring application for setting the duration of the time interval in which a length is to be produced and a value of W which is used as a weight factor in selecting the relative effect to be given to path deviation and velocity error. From the values given of $K=160$, the time duration becomes the reciprocal of 160 or slightly more than 6 milliseconds while the effect to be given path deviation of $W=42$ as opposed to a weight factor of 16 for velocity error thus makes the path deviation almost three times as effective in selecting a length as the velocity error. Preferably the information of K and W are set for a plurality of commanded movements and are not inputted for each movement since in most instances the desired emphasis is to minimize deviation while tolerating velocity error. As to the time interval, it is fixed by the inherent characteristics of the servo drives to accept changes in velocity between different successive time intervals and generally remains constant.

The determination method described by the flow chart has a plurality of representations in addition to those set forth above. As pointed out, the input distances and directions of $\Delta X$, $\Delta Y$, $\Delta Z$, feedrate of F as well as values of K and W are stored in registers and preferably remain constant throughout the movement. Other representations used in the flow chart are XREV (YREV and ZREV) which represents a bistable device indicating the direction of movement of the length being transferred to the motor control for the X (Y, Z) axis and NXX (NYX and NZX) which represents a register that has the numerical number of the extent along the X (Y, Z) axis for the length that has been determined. Both XREV and NXX constitute the output of the method to the motor control for the X axis, the other axes being similar.

In accordance with the present method the determination for the extent of each length is based upon initially determining the axis having the largest distance (L), the middle distance (M) and the smallest distance (S) and using these values for the determination for each length. L (M, S) thus represents a register which is set to the value and direction for the largest (middle, smallest) distance axis. For correlating the X, Y and Z axes with the L, S and M axes, there is provided a register CM which by the selection of any one of six code numbers stores the code for the commanded movement between the three part moving axes and the three length determination axes.

The remaining representations used in the method relate to L, M and S values and include IPL (IPM, IPS) which represents a register that stores the absolute value of L (M, S) and remains constant throughout the commanded movement; BLL (BLM, BLS) which represents a register which changes its numerical value with each length to maintain an indication of the distance remaining in the commanded movement on the L (M, S) axis; NCL (NCM, NCS) which represents a register that stores the distance through which the L (M, S) axis has accelerated; BNL (BNM, BNS) which represents a register that stores the distance needed for deceleration on the L (M, S) axis and is basically equal to the acceleration distance on its axis; and NLX (NMX, NSX) which represents a register that has the extent on the L (M, S) axis of the selected length that has been determined and which is directed by the coded CM register to its corresponding part moving axis.

In the determination, further representations which are used for different lengths are NLXMIN (NMXMIN) which represents a register that stores the minimum extent on the L (M, S) axis for the length being determined; NLXMAX (NMXMAX, NSXMAX) which represents a register that stores the maximum extent for the length being determined on the L (M, S) axis; and NLS (NMS, NSS) which represents a register that stores the extent on the L (M, S) axis of the most acceptable length considered during a length determination.

The representations relating to velocity include DF which represents a register that initially stores the weighted number of theoretical steps per time interval commanded by the input feed rate F and then is modified to store the proportional share of the commanded feed rate that is attributable to the velocity only in the L-M plane so that velocity is only considered in this plane; DA which represents a register that contains the weighted actual velocity in the L-M plane for a minimum length; DP which represents a register that stores the weighted actual velocity in the L-M plane for the length that has been determined; ED which represents a register that accumulates the weighted velocity error but only after a length has equalled or exceeded the commanded velocity; ES which represents a register that stores the smallest value of weighted velocity error found during the determination of a length; AD which represents a bistable device that attains the state of 1 with the first length that has a velocity which equals or exceeds the commanded velocity and remains in this state for the remainder of the movement; AI (AM, AS) which represents a bistable device for assuring that after a zero extent of a length on an axis, the next two subsequent lengths will be of an extent which assures that the servo motor drive on the L (M, S) axis will achieve a K velocity; and DL (DM) which represents the register that stores the value of weighted velocity error produced by one step in the L-M plane on the L (M) axis.

The representations for path deviation include the following representations, namely, EIL which represents a register that maintains an accumulated indication of the actual deviation in the L-M plane; EIS which represents a register that maintains an indication of the actual deviation in the L-S plane; WEILM which represents a register that has the weighted path deviation produced by a step on the L axis in the L-M plane; WEIML which represents a register that has the weighted path deviation produced by an M step in the L-M plane; WEISL which represents a register that contains the weighted path deviation produced by an S step in the L-S plane; WEIL which represents a register that has the weighted path deviation of a possible length in the L-M plane; WEIS which represents a register that has the weighted path deviation produced by a possible length in the L-S plane; LU which represents a register that stores the value of the square root of the sum of the distances squared along the three axes and P which represents a register which stores the value of the square root of the sum of the squares of the distances along the L and M axes.

In the combining of the weight effect of the path deviation and velocity errors, the representation WE represents a register that contains the sum of weighted deviation and weighted velocity error for the possible extent being considered and WS represents a register that stores the least value of WE found while investigating the possible lengths.

Referring again to FIG. 2, a block 20 determines the value of DF in weighted theoretical steps along the commanded path from the feed rate F with the numerical value being dependent upon the linear movement produced by a step on each axis in the reciprocal of a K time interval. The program proceeds to a point 21 to have the L, M and S registers set to the respective distances of the three axes and the code number stored in CM. At a point 22, the direction of the three part moving axes has been stored and at the point A at the bottom of FIG. 2 the weighted velocity error approximations for the effect of an L and an M step in the L-M plane have been determined. A block 23 (FIG. 2A) determines the weighted path deviation for a step on the different axes in the manner indicated. Also the value of DF, which had previously been calculated by block 20 for three axes is modified to find the value caused by the proportion thereof only in the L-M plane.

Figure 2A:
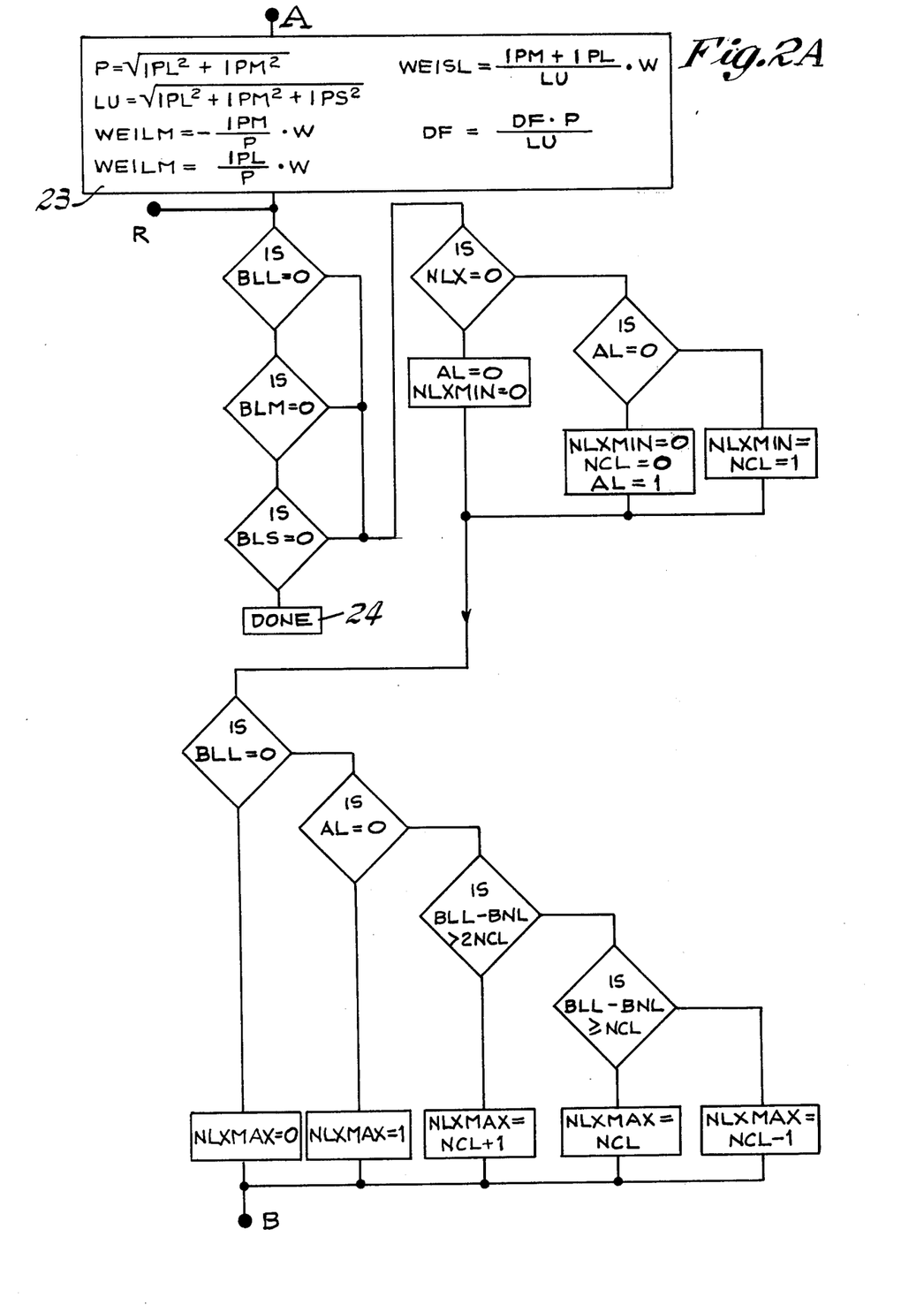

From the block 23 the remaining portion of the method is followed for each length as the calculations that have been made before remain constant throughout the whole commanded movement. Thus, there is a connection to the program denoted R which is the reentry position for the method when there is a request for another length determination from the new determination request 16 of the motor control. If a movement is complete, it is so indicated by a block 24.

Figure 2B:
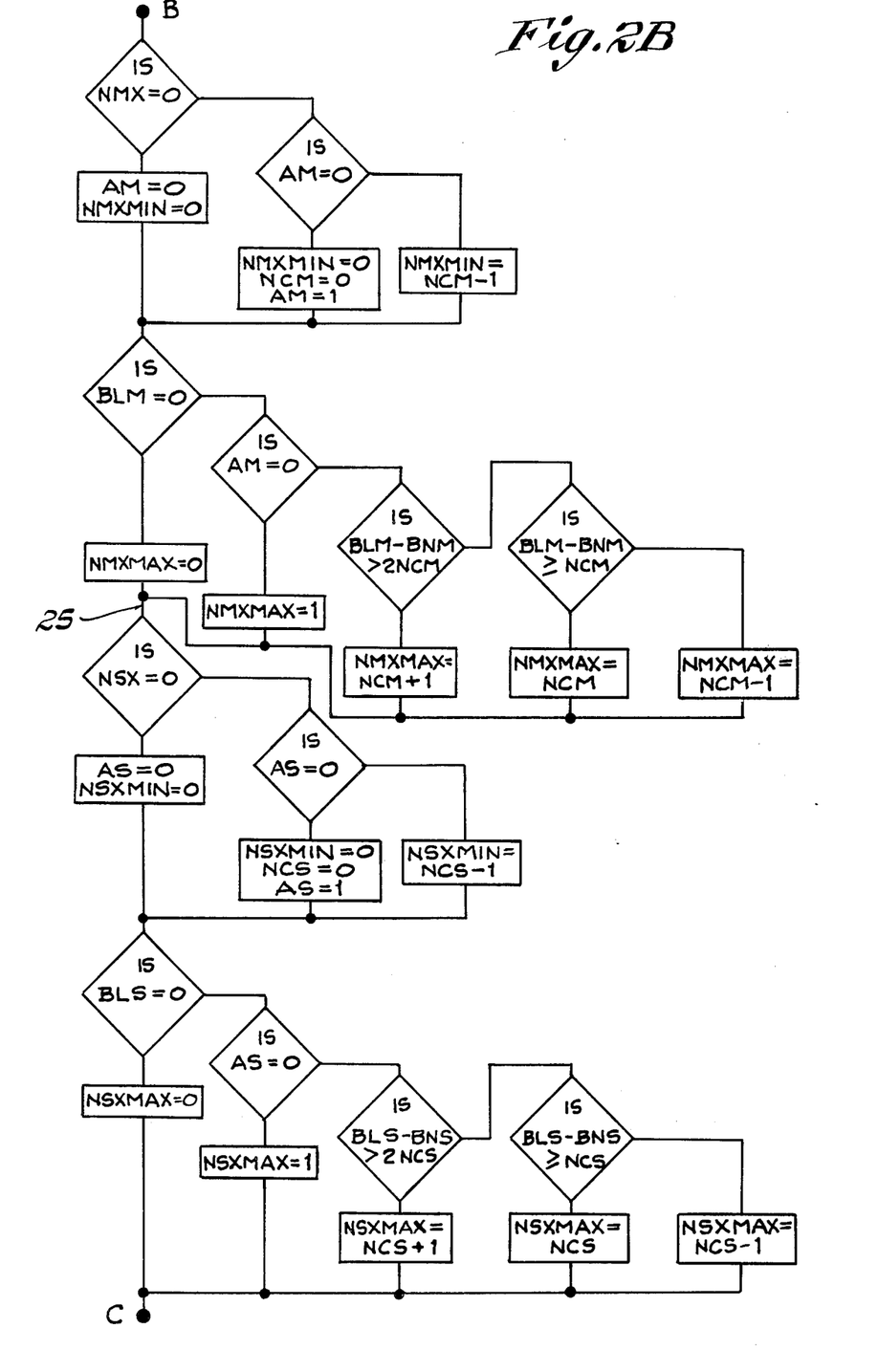

Assuming, however, that a length is to be determined, the method sets the minimum and maximum extents of the possible lengths on the L axis from the block 23 through the point B at the bottom of FIG. 2A. Through a point 25 in FIG. 2B, the method sets the minimum and maximum extents on the M axis of the possible lengths while through the point C at the bottom of FIG. 2B, the minimum and maximum extents for the smallest axis possible lengths are determined.

It will be understood that an extent along an axis of a possible length is within an absolute value of 1 from the extent along the same axis for an immediately preceding length. Thus, an extent can be the same or ±1 from the previous extent on the same axis. Further, acceleration and deceleration requirements may exclude some extents from being possible. It is also noted that an absolute value of more than 1 may be used if desired. Reference is made to my above-noted copending application for a fuller description of the extent determinations.

Figure 2C:
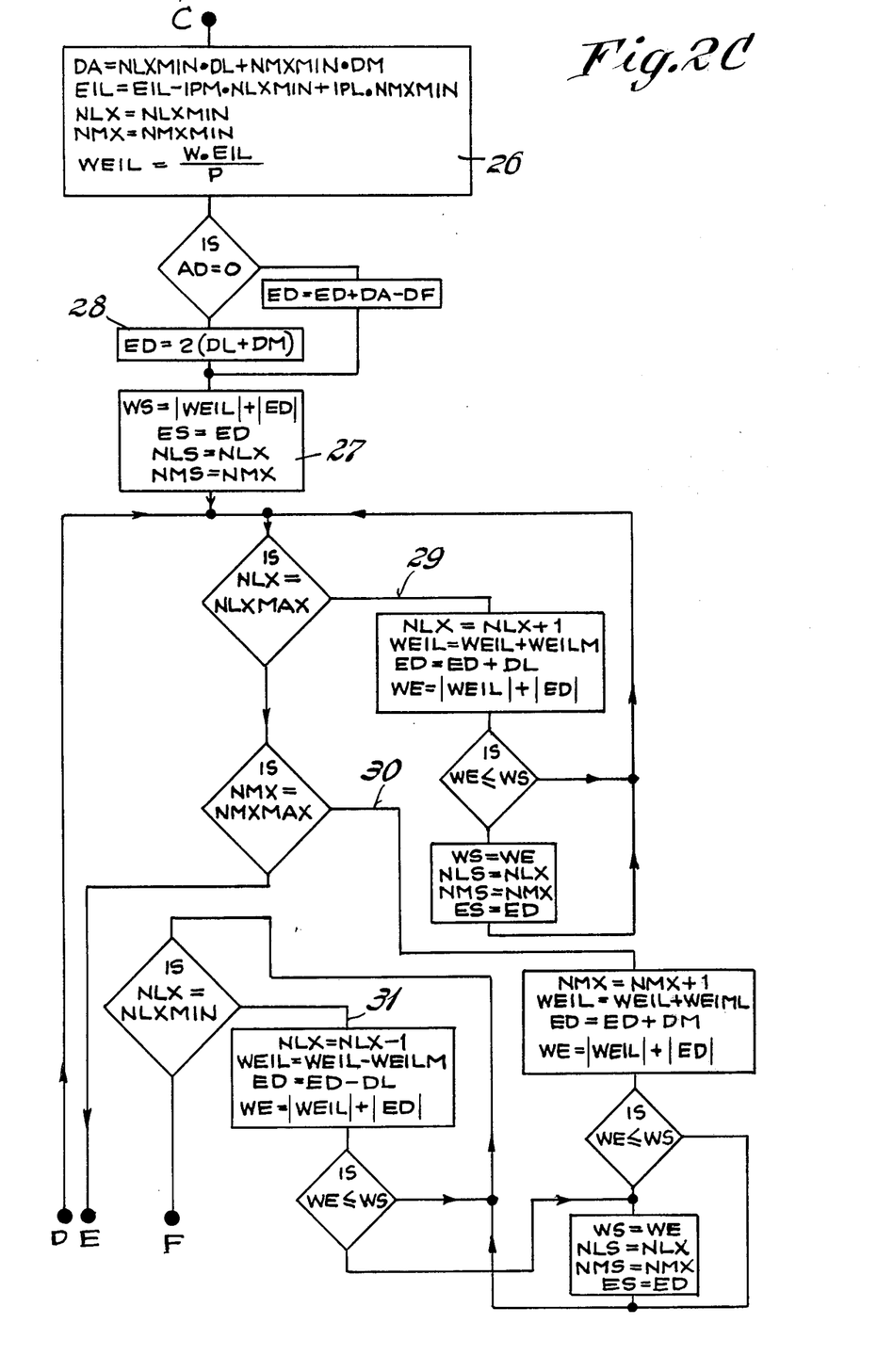

Beginning with a block 26 at the top of FIG. 2C, the method first finds the most acceptable length of the possible length in the L-M plane. Thus, the block 26 determines the weighted actual velocity DA that would be caused by a minimum length in the L-M plane. Also the accumulated path deviation register EIL is up-dated by including the deviation produced by the minimum length, the values of NLX and NMX are set to the minimum length and the weighted accumulated path deviation in steps is determined. The minimum length values of WS, ES, NLS and NMS are set by a block 27 with a value of ED being rendered quite small by a block 28 if the method has not yet produced a length which is equal to or greater than the commanded feed rate DF.

From the block 27 the method investigates which of the remaining eight (or less) possible lengths is more acceptable than the minimum length by finding the value of WE for each length. Any value of WE that is equal or less than WS causes that length to be the most acceptable length found during the investigation of the possible length and its values are retained as a basis for comparison with the remaining possible lengths. Thus, initially, the method traverses a path 29 to increase the extent along the L axis to its maximum while retaining the M axis extent at its minimum; traverses a path 30 to increase the M axis extent by one while decreasing the L axis by one; traverses a path 31 until the L axis extent is at its minimum; then follows a path through the reference letter F to FIG. 2D to increase, by way of a path 32, the extent of the M axis to its maximum and finally repeats the path 29 by return through the reference letter D from FIG. 2D to FIG. 2C until the maximum extents along both the L and M axis are reached. The method then proceeds through reference letter E to a block 33 (FIG. 2D) where the values of NLX, NMX and ED are set for the most acceptable length found of the possible lengths.

Figure 2D:
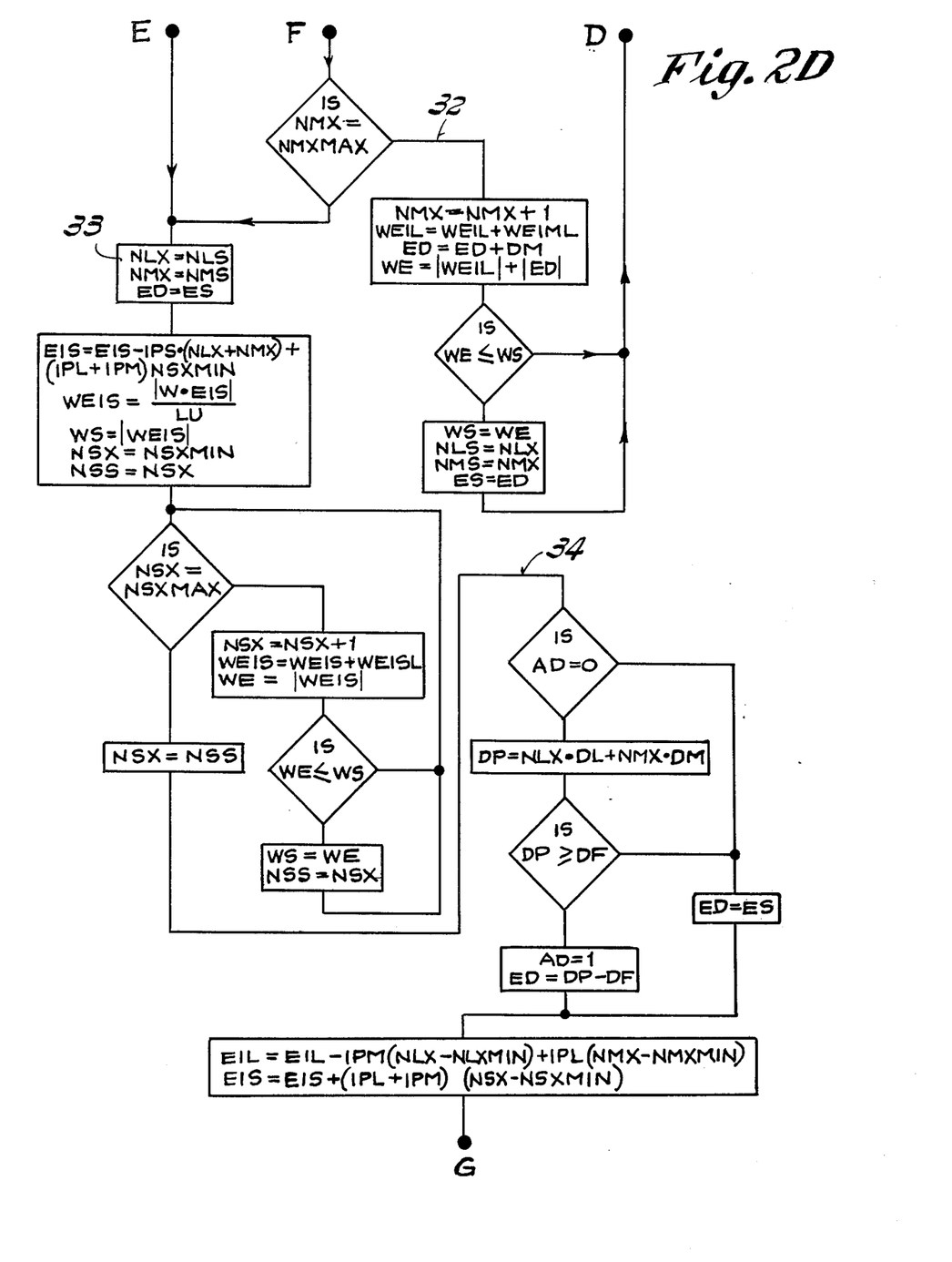

From the block 33, the method then determines the best value for the extent along the smallest axis of its possible extents by considering the effects of the extents solely on path deviation and selecting the extent having the least deviation. It will be noted that this determination is made in the L-S plane, that the path deviation in this plane is accumulated in register EIS and that the same extent for the L axis is employed in the 3 or less possible L-S extents that had been found most acceptable previously in the L-M plane.

From the point 34 to the remainder of FIG. 2D, the method considers if the state of AD should be changed, changes it if necessary and in either event up-dates the value of the weighted velocity error register ED. Similarly the path deviation registers EIL and EIS are accurately up-dated to include the deviation caused by the length determined.

Having determined the extent along each of the three axes L, M and S for the most acceptable length the system then (FIG. 2E) uses the code register CM to transfer the L, M and S axes contents to the corresponding X, Y and Z axes. A block 35 then supplies this information to the motor control 15 to effect a subsequent movement equal to the determined length by the three motors.

Figure 2E:
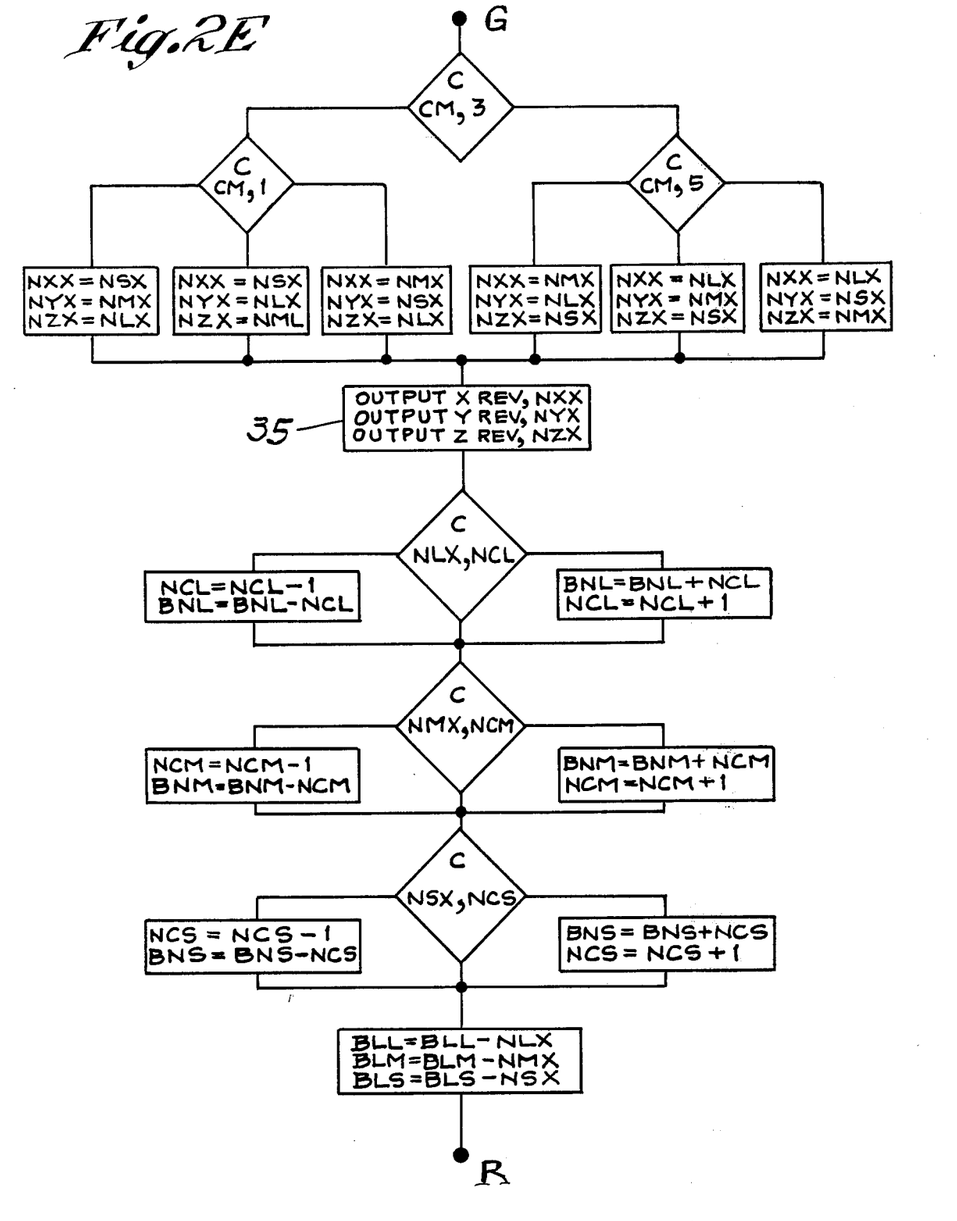

From the block 35 to the reference letter R at the bottom of FIG. 2E, the method up-dates the NCL and BNL registers for the largest axis and similarly for the middle and smallest axes for the effect caused by the length determined.

The method ends at a point R having produced the determined length together with the direction of movement and is set to repeat itself for the next length to be determined by returning to the corresponding letter R after the block 23 in FIG. 2A. If desired, a new determination request from the motor control 15 may be made a condition for repeating the method for the next length determination in view of the method being quicker in determining a length than the time interval utilized by the motors to produce the length movement. Further such a condition will insure that the motor control will be ready to accept information of the new length.

For a more detailed description of the weighted path deviation and weighted velocity error, reference is also made to my copending application Ser. No. 512,295 filed Oct. 4, 1974 and entitled "Arcuate Movement Numerical Control System and Method".

Though the above describes a three axes method and system, it is contemplated that a movement on more than three axes may be produced by the addition of a servo motor for each additional axis. As to the method, the determinations for the L and M extents would remain the same while for each additional axis, a repeating of the determination for the S axis extent only would be required.

It is contemplated that in order to decrease the overall computer time required for determining lengths, that some double-size lengths may be used for time intervals of double-duration, especially during portions of the movement at or about the commanded velocity. When double-lengths are employed, each double length on an axis will differ in extent from the previous axis extent by an absolute value of 1 or such other preselected constant which preferably would be the same constant as for differences in axis extent for single lengths.

While the length values are herein transferred directly to the motor control 15 in the form of electrical representations, it is within the scope of the present invention that the values of the lengths could be stored in storage means such as punched tape, binary memory, etc., in either the same form of representations supplied the motor control or else in a coded increment format which may only store the differences between lengths thereby generally permitting a reduction in the quantity of storage required.

It will accordingly be understood that there has been disclosed a method and numerical control system for relatively traversing an actual path by movement along at least three coordinate axes. The actual path closely conforms both as to deviation and velocity to a commanded path defined by the distance along each of the axes. The method subdivides the actual path into a plurality of successive lengths with each length having an extent on each axis that is within an absolute numerical value of the same axis extent of the immediately preceding length. The method determines the most acceptable length as to path deviation and velocity error in a plane having the axes which have the largest and middle distances, normally from a plurality of possible lengths. After the extents along these two axes have been determined, the method then selects the extent along the smallest axis from the possible lengths in the L-S plane which produces the least deviation with each possible length having the same extent along the largest axis that had previously been determined. The extents along the three axes for each length are produced as movements by a motor means connected to each axis with the movements being essentially simultaneously produced over the same time interval.

Variations and modifications may be made within the scope of the claims and portions of the improvements may be used without others.

I claim:

1. The method of producing relative actual movement along three coordinate axes in accordance with a commanded path defined by the distance along each of the three axes with the movement consisting of steps along each axis comprising the steps of subdividing the movement into a plurality of successive lengths, selecting the extent of each length along each axis normally from a plurality of different possible lengths with each possible length normally having a plurality of steps along each axis with the number of steps of each possible length on each axis being no greater than an absolute numerical value of one from the number of steps in the immediately prior length on the same axis and producing a relative movement essentially simultaneously along each axis equal to their respective extents in the selected length with the movement for each length occurring in the same constant time interval.

2. The invention as defined in claim 1 in which the step of selecting includes determining a planar length in a plane formed by the axes in the commanded path having the largest and middle distances with the planar length being within an acceptable deviation from a planar commanded path defined by the two distances and setting the extents of the selected length along the largest and middle distance axis to the corresponding extents determined for the planar length.

3. The invention as defined in claim 2 in which the step of selecting determines the extent along the smallest distance axis that produces a minimum deviation from a planar commanded path defined by the largest and smallest distances and setting the extent of the smallest distance axis to the extent so determined.

4. The invention as defined in claim 3 in which the step of determining normally includes considering a plurality of possible lengths along the largest and smallest distance axes and in which each possible length has the same extent along the largest distance axis.

5. The invention as defined in claim 4 in which the step of considering possible lengths has the extent of each possible length along the smallest axis to be normally no greater than an absolute value of 1 from the extent along the smallest axis for the immediately preceding length.

6. The invention as defined in claim 1 in which the step of selecting includes determining a planar length in a plane formed by the axes having the largest and smallest distances with the planar length determined being that which produces a minimum deviation from a planar commanded path defined by the two distances and setting the extent of the selected length along the smallest distance axis to the extent determined for the corresponding axis of the planar length.

7. The invention as defined in claim 1 in which there is a commanded velocity along the commanded path, in which the step of selecting includes determining the extents along two axes that produces the most acceptable length as to path deviation and velocity error from a planar commanded path defined by the commanded distances along the same two axes and setting the extents of the selected length along the same two axes to the determined extents.

8. The invention as defined in claim 7 in which the step of selecting includes determining the extents along one of the two axes and the third axis that produces an acceptable deviation from a planar commanded path defined by the commanded distances along the one and the third axis and setting the extent of the third axis of the selected length to the third axis extent determined.

9. The invention as defined in claim 7 in which the commanded velocity is expressed as a velocity along the commanded path, in which the two axes selected are the two axes which have the largest distances and in which there is the step of calculating the proportion thereof that is attributable to the distances along the two axes.

10. The invention as defined in claim 9 in which the step of determining the third axis extent includes determining the extent only with regard to path deviation.

11. A numerical control system for producing actual relative movement along three coordinate axes with a minimum deviation from a commanded path defined by the distance along each axis with the movement consisting of steps along each axis comprising motor means connected to each axis for producing a determined extent of movement with the determined extents for the three axes being essentially simultaneously produced, means for receiving information of the commanded path, means for subdividing the commanded path into a plurality of successive actual lengths with the lengths constituting the movement, means for normally selecting a plurality of different possible lengths for each length with each possible length normally having a plurality of steps along each axis with the number of steps of each possible length on each axis being no greater than an absolute numerical value of one from the number of steps in the immediately prior length on the same axis, means for determining one possible length which produces an acceptable deviation from the commanded path and means for directing the determined length as a determined extent on each axis to its respective axis motor means to produce the actual length with the movement for each length occurring in the same constant time interval.

12. The invention as defined in claim 11 in which the means for determining includes means for setting the extent along two axes by considering only the distances along the two axes.

13. The invention as defined in claim 12 in which the means for normally selecting includes means for providing only different possible lengths that have the same extent set for one of the two axes with the extent of the third axis being different between the possible lengths.

14. The invention as defined in claim 11 in which the commanded path includes a commanded velocity and in which the means for determining determines the one possible length for two axes that produces the most acceptable path deviation and velocity error from a path defined by the distances of the two axes.

15. The invention as defined in claim 14 in which the means for determining includes means for setting the determined extent along the third axis to be at a minimum path deviation from a path defined by one of the two axes distances and the third axis distance.

16. The invention as defined in claim 15 in which the one axis distance is the largest distance and the third axis distance is the smallest distance.

17. The invention as defined in claim 11 in which each motor means translates each pulse received essentially simultaneously into an increment of movement and in which the means for directing causes the extent of each length on each axis to be received as a number of evenly spaced pulses to its respective motor means.

* * * * *